C. Worden,
Nutmeg Grater,
No. 69,150. Patented Sep. 24, 1867.
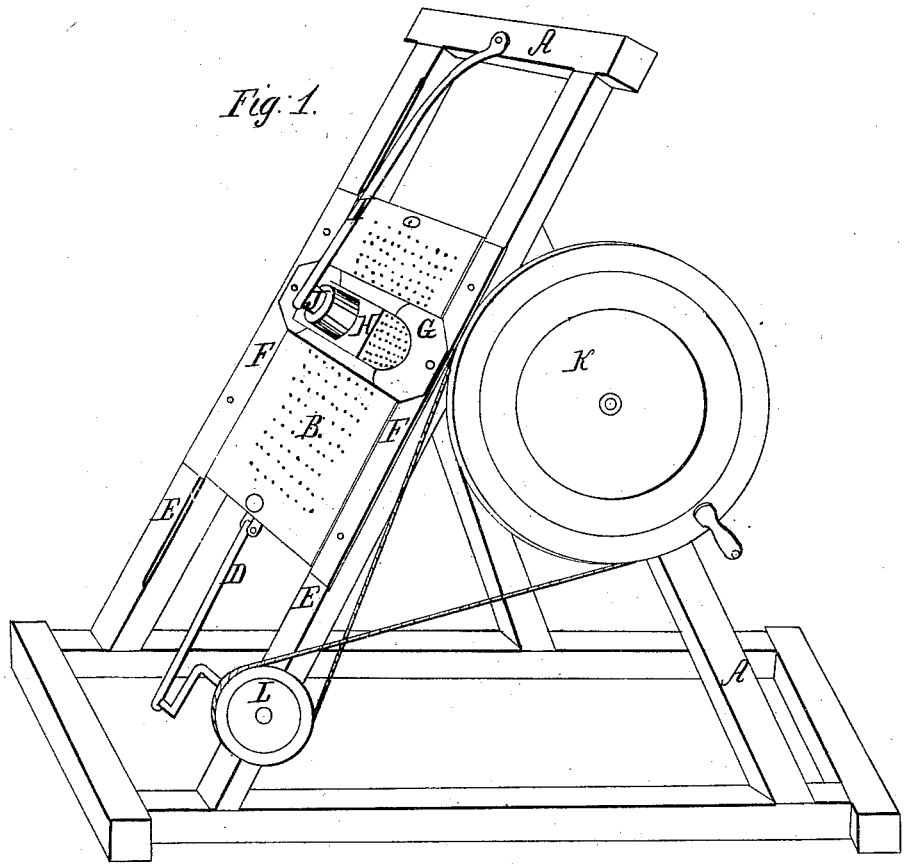
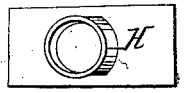
Witnesses:
A. E. Andrus
James Flynn
Inventor,
Carey Worden

United States Patent Office.

CAREY WORDEN, OF BINGHAMTON, NEW YORK.

Letters Patent No. 69,150, dated September 24, 1867.

---

IMPROVED NUTMEG-GRATER.

---

*The Schedule referred to in these Letters Patent and making part of the same.*

---

TO ALL WHOM IT MAY CONCERN:

Be it known that I, CAREY WORDEN, of Binghamton, county of Broome, and State of New York, have invented a new and useful Improvement on Nutmeg-Graters; and I do hereby declare that the following is a full, clear, and exact description of the construction and operation of the same, reference being had to the annexed drawings, making a part of this specification, in which—

Figure 1 is a perspective view, showing the apparatus in all its parts.

Figure 2 represents the slide-holder detached.

Like letters represent like parts in each figure.

The nature of my improvement consists in the employment of a grater secured in a frame, to which a reciprocating motion is given by suitable gearing, connected either by a driving and crank-wheel, by means of a band, or by a toothed wheel and pinion, so nutmegs or other substances may be grated up without leaving a residuum, and the grater kept clear from clogging, thereby obviating the necessity of a brush, and otherwise facilitating the operation.

I construct the frame A of my apparatus of wood, or other suitable material. The face of the grater B has a plane surface, and is attached to a guide, which connects with the crank C by means of the connecting-rod D; said guide works on ways grooved in the corners of the upright pieces E E and the guards F F. I then attach a slotted plate, G, over and across the grater, so that the teeth will clear it when in operation. The edges of said plate are turned over for a guide to the slide-holder H, which has a tube in the centre to hold the nutmeg, which is pressed against the grater by a spring, I, attached to the cross-piece on the upper end of the frame. On the free end of this spring I attach a follower, J, which fits loosely in the tube, and bears upon the substance to be grated. The driving-wheel K is attached to the frame, and connects with the crank-wheel L by means of a band, or it may be operated by a toothed wheel and pinion.

In using my improvement I place the nutmeg or substance to be grated under the follower, and give the driving-wheel about fifty revolutions a minute. The alternate motion thus given to the grater keeps it clear from clogging, thereby obviating the necessity of a device for that purpose, as is required by the revolving cylindrical graters in common use. When the nutmeg is nearly grated another is placed in position over it, for the purpose of working up the residue of the one that preceded it. The follower J is prevented from reaching the grater by the contact of the spring with the top of the tube.

Having thus described my invention, what I claim, and desire to secure by Letters Patent, is—

The construction and arrangement of the frame A, grater B, slotted plate G, slide-holder H, spring and follower J, substantially as described and represented for the purpose set forth.

CAREY WORDEN.

Witnesses:
A. E. ANDREWS,
JAMES FLYNN.